US008452800B2

(12) United States Patent
Pickens et al.

(10) Patent No.: US 8,452,800 B2
(45) Date of Patent: May 28, 2013

(54) SYSTEMS AND METHODS FOR COLLABORATIVE EXPLORATORY SEARCH

(75) Inventors: Jeremy Pickens, Milpitas, CA (US); Maribeth Back, Woodside, CA (US)

(73) Assignee: Fuji Xerox Co., Ltd., Kanagawa (JP)

( * ) Notice: Subject to any disclaimer, the term of this patent is extended or adjusted under 35 U.S.C. 154(b) by 1262 days.

(21) Appl. No.: 11/781,191

(22) Filed: Jul. 20, 2007

(65) Prior Publication Data

US 2009/0024581 A1    Jan. 22, 2009

(51) Int. Cl.
*G06F 7/00*   (2006.01)
*G06F 17/30*   (2006.01)

(52) U.S. Cl.
USPC ............................ 707/769; 707/608; 715/751

(58) Field of Classification Search
USPC .................... 707/769, 608; 715/751
See application file for complete search history.

(56) References Cited

U.S. PATENT DOCUMENTS

| | | | |
|---|---|---|---|
| 6,295,550 B1 * | 9/2001 | Choung et al. | 709/204 |
| 6,732,088 B1 * | 5/2004 | Glance | 1/1 |
| 6,745,178 B1 * | 6/2004 | Emens et al. | 707/741 |
| 6,985,898 B1 * | 1/2006 | Ripley et al. | 1/1 |
| 2002/0042793 A1 * | 4/2002 | Choi | 707/6 |
| 2004/0078204 A1 * | 4/2004 | Segond et al. | 704/277 |
| 2005/0262052 A1 * | 11/2005 | Daniels et al. | 707/3 |
| 2006/0271524 A1 * | 11/2006 | Tanne et al. | 707/3 |
| 2007/0061244 A1 * | 3/2007 | Ramer et al. | 705/37 |
| 2007/0112759 A1 * | 5/2007 | Kulakow et al. | 707/5 |
| 2007/0129014 A1 * | 6/2007 | Bertorello et al. | 455/41.2 |
| 2007/0198500 A1 * | 8/2007 | Lucovsky et al. | 707/4 |
| 2008/0010605 A1 * | 1/2008 | Frank | 715/765 |
| 2008/0243819 A1 * | 10/2008 | Sareen et al. | 707/5 |
| 2008/0319975 A1 * | 12/2008 | Morris et al. | 707/5 |
| 2009/0006358 A1 * | 1/2009 | Morris et al. | 707/5 |
| 2009/0285031 A1 * | 11/2009 | Rajan et al. | 365/189.2 |

OTHER PUBLICATIONS

Foley et al. "Synchronous collaborative information retrieval with relevance feedback" In: CollaborateCom 2006—2nd International Conference on Collaborative Computing: Networking, Applications and Worksharing, Nov. 17-20, 2006, Atlanta, Georgia.*
Morris, et al., "TeamSearch: Comparing Techniques for Co-Present Collaborative Search of Digital Media". The First IEEE International Workshop on Horizontal Interactive Human-Computer Systems, 2006.*
Smeaton, et al.,"Físchlár-DiamondTouch: Collaborative Video Searching on a Table" SPIE Electronic Imaging—Multimedia Content Analysis, Management, and Retrieval, San Jose, CA, Jan. 15-19, 2006., SPIE-IS&T/vol. 6073 607308-1.

(Continued)

*Primary Examiner* — Shew-Fen Lin
(74) *Attorney, Agent, or Firm* — Sughrue Mion, PLLC

(57) ABSTRACT

Described is a new framework that combines the best of both exploratory search and social search: Collaborative exploratory search. This system allows a small group of focused information seekers to search through a collection of information in concert. The system provides exploratory feedback not only based on the individual's search behavior, but on the current, active search behavior of one's fellow search allies. The assumption is that the users who have gotten together to search collaboratively have the same information need, but differing perspectives and insights as to how to best express the queries to meet that need. The collaborative exploratory search system will therefore provide tools and algorithmic support to focus, enhance, and augment searcher activities. Searchers can, by interacting with each other through system-mediated information displays, help each other find all relevant information more efficiently and effectively.

38 Claims, 3 Drawing Sheets

OTHER PUBLICATIONS

Ringel-Morris, et al., "TeamSearch: Comparing Techniques for Co-Present Collaborative Search of Digital Media". The First IEEE International Workshop on Horizontal Interactive Human-Computer Systems, 2006.

Twidale., et al.,"Designing Interfaces to Support Collaboration in Information Retrieval" (1998) Interacting with Computers, 10(2), 177-93.

Baeza-Yates et al., Towards Formal Evaluation of Collaborative Work, vol. 11 No. 4 Jul. 2006.

* cited by examiner

SYSTEMS AND METHODS FOR COLLABORATIVE EXPLORATORY SEARCH

DESCRIPTION OF THE INVENTION

1. Field of the Invention

The present invention generally relates to search technology and, more specifically, to techniques for collaborative exploratory search.

2. Description of the Related Art

Most modern information retrieval (search) systems are geared toward helping a user quickly and effectively navigate to one particular item. That item may include things such as a document, a geographic location, or a factoid. This approach is good when a single piece of information can fulfill the user information need. However, in many situations multiple items and/or richer overviews of the entire information space are necessary. In support of this, exploratory search systems have been and continue to be developed. An exploratory search system is one that allows an intelligent mixture strategy of searching and browsing, often accompanied by tools such as query expansion term suggestion, document clustering, and document visualization in order to help the user better understand the range of available information.

Currently, there is also much work around mass social search, or aggregation of large-scale user intention and information seeking behaviors. Web service sites such as del.icio.us and Digg let users bookmark and/or cast votes around their favorite pieces of information. This aggregate crowd behavior is used to steer the individual searcher toward the most relevant items. However, the problem with such systems is not only that there will be large numbers of documents in a system with no prior user attention at all, but the intentionality or information need of the crowd might not match the need of the current searcher.

Moreover, when doing exploratory searches, it is useful to have more than one person involved in finding all relevant information. However, current systems do not support active collaboration between searchers. Therefore, effort will be duplicated (wasted) and insights into potentially useful search avenues will not be obtained.

Thus, the existing technology is deficient in its ability to provide users with a framework that combines elements of both exploratory search and social search in one collaborative search system that actively coordinates and supports multi-user information seeking.

SUMMARY OF THE INVENTION

The inventive methodology is directed to methods and systems that substantially obviate one or more of the above and other problems associated with conventional search systems.

In accordance with one aspect of the inventive concept, there is provided a joint search subsystem operable to actively coordinate search activities of a plurality of individuals with a shared information need. The active coordinating according to the aspect of the inventive concept involves causing search activities of a first one of the plurality of individuals to actively affect a second set of information provided to a second one of the plurality of individuals, and causing search activities of the second one of the plurality of individuals to actively affect a first set of information provided to the first one of the plurality of individuals.

In accordance with another aspect of the inventive concept, there is provided a collaborative search method for actively coordinating search activities of a plurality of individuals with a shared information need. The active coordinating according to the aspect of the inventive concept involves causing search activities of a first one of the plurality of individuals to actively affect a second set of information provided to a second one of the plurality of individuals, and causing search activities of the second one of the plurality of individuals to actively affect a first set of information provided to the first one of the plurality of individuals.

In accordance with yet another aspect of the inventive concept, there is provided a computer readable medium embodying computer-readable instructions implementing a collaborative search method for actively coordinating search activities of a plurality of individuals with a shared information need. The active coordinating according to the aspect of the inventive concept involves causing search activities of a first one of the plurality of individuals to actively affect a second set of information provided to a second one of the plurality of individuals, and causing search activities of the second one of the plurality of individuals to actively affect a first set of information provided to the first one of the plurality of individuals.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one embodiment of the inventive concept, a new framework is provided that combines the best of both exploratory search and social search, which is called herein collaborative exploratory search. An embodiment of the inventive system actively coordinates, facilitates, and mediates the collaborative searching behavior of a focused (i.e. common information need) team of searchers. The inventive system allows a small group of focused information seekers to search through a collection of information in concert. The inventive system provides exploratory feedback not only based on the individual's search behavior, but on the current, active search behavior of one's fellow search allies.

The aforesaid embodiment of the inventive methodology is based, at least in part, on the assumption that the users who have gotten together to search collaboratively have the same information need, but differing perspectives and insights as to how to best express the queries to meet that need. The inventive collaborative exploratory search system will therefore provide tools and algorithmic support to focus, enhance, and augment searcher activities. Searchers can, by interacting with each other through system-mediated information displays, help each other find all relevant information more efficiently and effectively.

Figure 1:
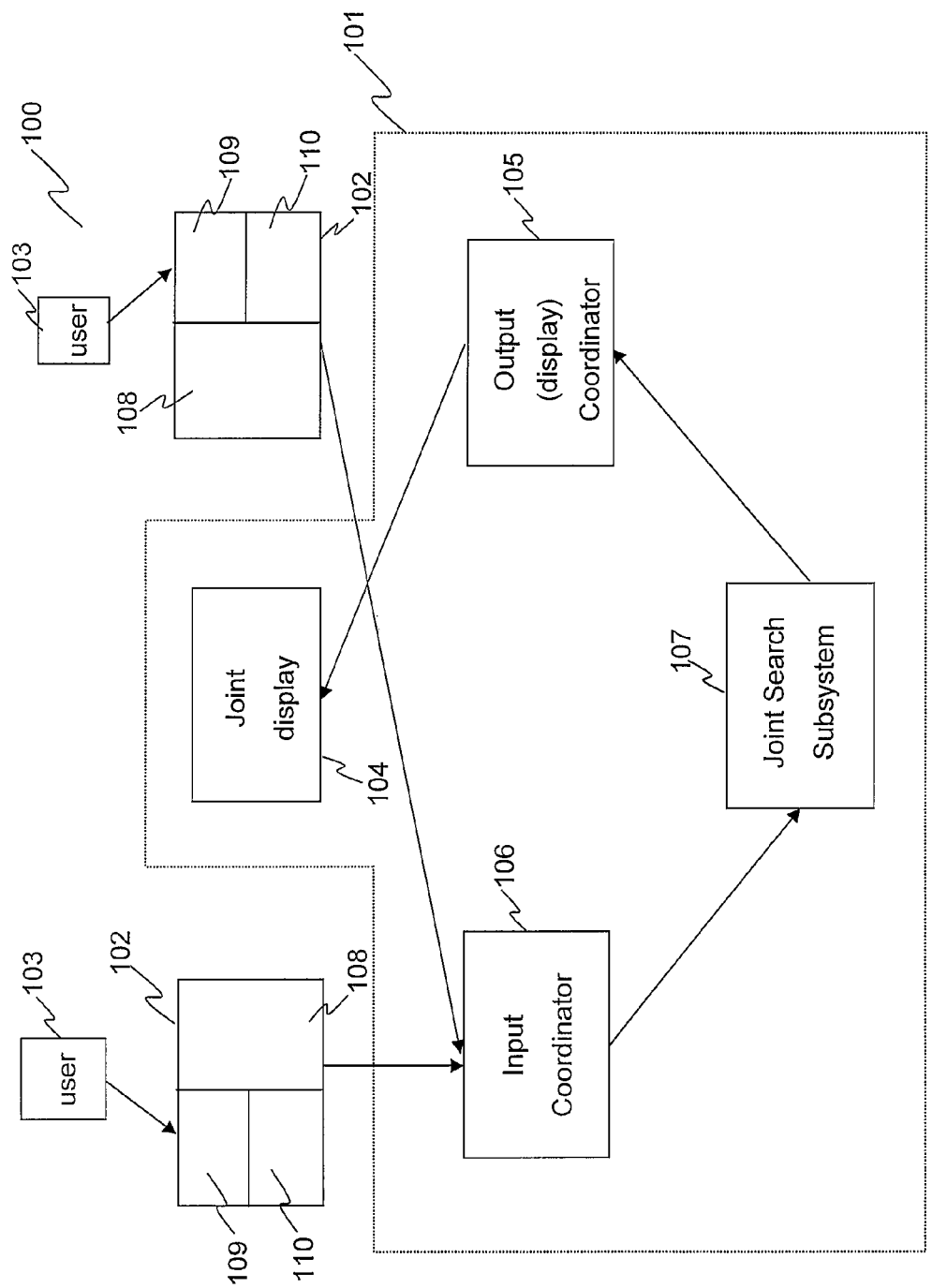
FIG. 1 illustrates an exemplary embodiment of the configuration of the inventive collaborative search system.

Therefore, in the inventive framework two (or more) people can search collaboratively, bringing multiple human intelligences and points of view to a shared problem on a shared system. The system will take an active role in coordinating searcher activity. This novel concept is illustrated in FIG. 1. In this figure, numeral 101 designates the inventive shared search system, which is shared by human searchers 102 and 103, each of which interacts with the system 101 and with each other.

The inventive shared search system is designed for rich, layered exploratory search, rather than focused single-point answers as delivered by most current search engines. But more importantly, the inventive system takes into account the searches and documents found by one's partners and can use that information to enhance and augment the individual search activities of each user of the system. Overall, the inventive system will give users information and insight that they otherwise would not have come up with on their own. It will do so rapidly and from multiple perspectives. Finally, it will leverage and support co-presence in search.

System Overview

An embodiment of the inventive collaborative exploratory search system 100 illustrated in FIG. 1 has two primary components. Specifically, the aforesaid embodiment of the inventive system 101 incorporates a shared system portion and multiple individual portions 102 used exclusively by each user 103.

(1) The shown exemplary embodiment of the shared system portion 101 includes:
    a. A joint information display 104. The joint information display 104 serves to summarize the collaborative information seeking activities of all users 103 of the system.
    b. An output display coordinator 105 for manipulating information on the joint information display 104.
    c. An input coordinator 106 receives information from individual portions 102.
    d. A joint search subsystem 107 is responsible for coordinating individual search activity of the users 103.

(2) The individual system portion 102 is provided for each user 103 of the system and includes:
    a. An individual information display component 108, showing the results of the individual's interactions with the system.
    b. An individual input device 109 providing system interaction capability with the individual users 103.
    c. An individual search subsystem 110, giving individual user 103 the search results. However, the aforesaid individualized search results provided to the user 103 by the individual search subsystem 110 are not necessarily the same results one would have obtained if the user performed searching alone. The aforesaid search results may be reviewed and updated by other searchers in the group, using the capability provided by the joint search subsystem 107 described in (1c) above.

The core part of the aforesaid embodiment is the shared system portion 101 and especially the joint search subsystem 107. Using the inventive system, any group of individuals can sit down together at multiple computers and start searching for information to fill a shared need. What searchers currently cannot do using the conventional searching technology, is to be actively and transparently influenced, through the joint search system, by the results of others' searches. Having an inventive joint system that coordinates and enhances individual searches remedies this deficiency.

EXAMPLES

As mentioned above, the inventive searching methodology is based on the notion of a system that actively coordinates the search activity of individuals with a shared information need. Below, several examples are provided that illustrate how different embodiments of the inventive system coordinate searcher activity. However, the aforesaid examples are not intended to limit the scope of the invention to only the described embodiments or the provided specific examples. As may be appreciated by those of skill in the art, various other systems consistent with the inventive concept of joining search activities of multiple users may be developed.

It should be noted that the nature of the collaborative facilitation provided by the inventive system depends in a large part on the underlying characteristics of the individual system components. Specifically, the following considerations are relevant to determining the extent and manner of the aforesaid collaborative facilitation. Are the individual users doing ad hoc, ranked list queries? Are the individual users using more of a faceting browsing interface? Are users doing any tagging or labeling (either tagging of topic, or tagging of relevance?) Additionally, what is the underlying retrieval model being used to provide search results? Is it Boolean, vector space, language model, or traditional TF.IDF? The mathematical formalism underlying the individual search component could have a large effect on not only how, but what type of coordination is possible.

These various individual components will require varying types of coordination support. What might work for one system or retrieval model might not work for another. Specifically, any systemic facilitation must be aligned with the nature of the underlying exploratory search system. Therefore, again, it needs to be emphasized that the examples provided below are illustrative and not limiting in their nature. The present invention encompasses the aforesaid inventive joint searching framework and each example below is yet another method for utilizing this inventive framework.

Example 1

In the very simplest case, multiple searchers sitting in front of their respective terminals, all execute multiple queries on an ad hoc retrieval system in an attempt to satisfy their collective information need. One user's activity is as follows:

(1) The user enters a query into the system;

(2) The results come back;

(3) The user reads the top N documents, selects all the relevant ones and discards the non-relevant ones;

(4) The user then modifies or creates a new query (though still in support of the same general information need) and returns to step (1). This is repeated M times.

The problem now is that, with conventional search systems, if two users enter the same query during step (1), the second user will not be aware that the first user has already executed this query. Thus when the second user reads the top N documents, he/she will be duplicating the efforts of the first user. This is avoidable if the users ask each other if a query has already been done, but that places excessive burden on the user, as every user must ping every other user every time a new search is attempted. The inventive system provides a collaborative module keeping track of the fact that a certain query has already been executed by a member of the search team and forwards that knowledge automatically and effortlessly to the second searcher, so as to avoid duplication of effort.

Information retrieval systems are evaluated in a number of different ways. One way is to measure the increase in precision (more relevant, fewer non-relevant documents). Another such way is to measure the overall search time. By reducing the collective effort amongst the collaborating searchers by avoiding duplicate searches, the inventive system reduces the total amount of work necessary to find all the relevant documents.

Example 2

In a situation similar to the one above, the inventive collaborative search system can be made to remember not just previously executed queries, but previously read documents. For example, each of the two searchers on the team executes a different query. There may be documents in the collection that rank highly (in the top N) for both queries. Whether or not these documents are relevant, if another user has already examined them, there is little need for the second user to do so as well. The second user can then dig deeper, or further down the ranked list, in a shorter amount of time. Accordingly, an embodiment of the inventive search system informs a user whether the relevance of a specific document found by that user has already been determined by another user. If so, the user does not need to re-evaluate the relevance of the found document.

For example, a team of two searchers is doing a collaborative exploratory search on the consumer video market. They want to find out as much information as possible on the various methods by which video is delivered to the home. Accordingly, the first user types the query "cable provider", and examines the top N documents. Then, the second user types the query "satellite service". This second user will find new documents, but probably a few "old" ones as well, as there are companies that provide both satellite and cable. Suppose there are n documents that overlap between both users' lists. Using the inventive system, the second user only has to examine (N−n) documents to get the same amount of information as before. Thus, he accomplishes the same task quicker than using the conventional system. Or, if the second user wants to devote the same amount of time to exploring new documents, he can now just as quickly read down to what would otherwise (without "duplicate" removal) have been the (N+n)th item in the list.

Example 3

The previous two examples are useful, but they do not demonstrate the full power of an embodiment of the inventive collaborative exploratory framework. They address efficiency issues, but the inventive system also increases the overall effectiveness of the search process, allowing users to find relevant documents that they otherwise would not have ever found on their own.

In the third example, two users use the inventive system to perform their searches, independently, using two different queries (e.g. "cable providers" and "satellite systems" from the previous example). In an embodiment of the inventive system, the users may use two different ranking engines or formulae to order the search results. Each user is scrolling down vertically through the list of documents, looking for items that are relevant.

Figure 2:
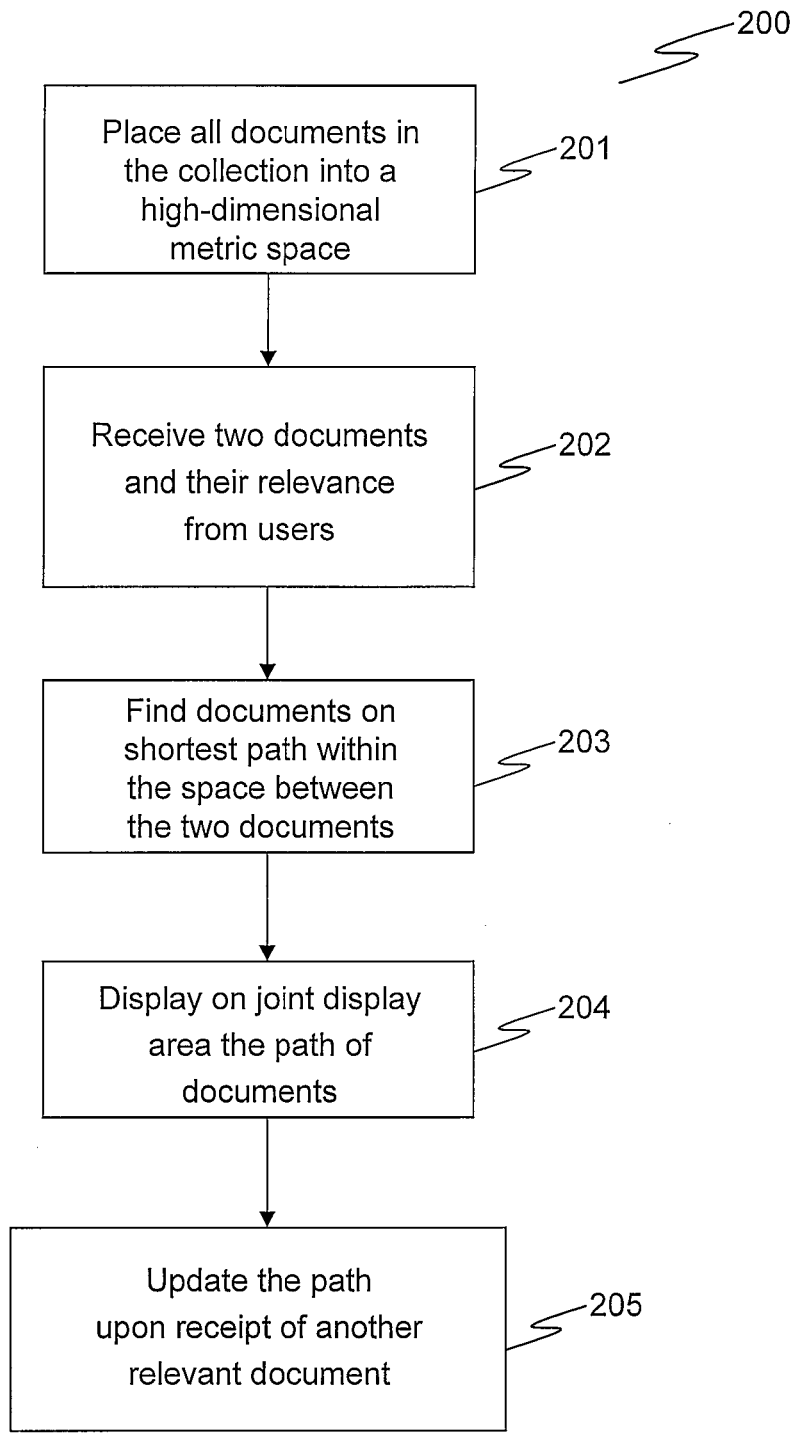
FIG. 2 illustrates exemplary operating sequence of an embodiment of the inventive collaborative search system.

When the first user finds a relevant document, he flags it. He then continues scrolling down the list, looking for more relevant items. A short time later, the second user, scrolling through a different ranked list, finds a different relevant document, and flags it. At this point, each individual search system passes this relevance information along to an embodiment of the inventive collaborative search subsystem. This embodiment of the search subsystem works as follows, see flow diagram 200 in FIG. 2:

(1) The inventive system places all the documents in the collection into a high-dimensional metric space, step 201;

(2) Upon receiving the two relevant documents, one from each user, the system locates those documents within the space, and sets those documents as the "endpoints," see step 202;

(3) The system then finds k documents that lie on the shortest path within the space between the two documents, see step 203;

(4) On a third, joint display area, the system shows that path of documents, allowing either user to examine any document along the path, see step 204;

(5) While continuing to scroll down through their own, independent results lists, if a user then flags another relevant document, his endpoint changes, and the shared pathway updates itself as well, see step 205;

(6) Additional enhancements are possible, as well. For example, a certain document or set of documents may repeatedly show up on multiple paths between user-selected relevant endpoints. If neither user has examined these document(s) yet, the system could make special effort to bring these documents to users' attention, as these documents may have a high chance of being relevant.

For example, users may be positioned on both sides of the inventive joint display screen. Each user would execute queries to the inventive search system. When a relevant document is found on each side, a pathway of documents on the joint screen is shown. If there is more than one good "navigation point" or "stepping stone" along the pathway, branches or sub-paths off of the main path may also be shown.

The notion of navigating a collection of documents by following near neighbors in metric space is not novel. The cluster hypothesis essentially implies this, and music discovery sites such as Pandora make music selection recommendations based on the proximity of songs in the aforesaid metric space. However, the inventive notion of fixing two endpoints in the document space, as a result of two user searches, and expanding the pathway between those endpoints is novel.

The inventive system allows two searchers to quickly explore regions of the document collection they otherwise might likely never have found on their own. Specifically, a user, acting alone, executes a single query, and in the absence of other information must browse neighbors in the metric space in an increasing radial manner, i.e. breadth first. By using a relevant document found by another user as an opposite endpoint, the first user may delve quickly, depth first, into a direction with known higher potential.

In another embodiment, a single user, acting alone, could use a relevant document found through his own previous searches as the other endpoint. However, because different users use different query terms to describe the same information needs, different users will potentially find different sets of relevant documents. And in that case, the collaborative nature of the inventive joint searching system will suggest to each individual user potential directions that they otherwise would not have thought to explore on their own. The joint system will help encourage explorations that individual users might never try, acting alone.

Example 4

In the previous example, it was mentioned that even though there are some query terms that overlap, different users also use different query terms to describe the same information need. As witnessed by other research in the area of statistical authorship classification, other researchers have acknowledged that there are noticeable statistical differences in the both the words and the forms (grammar) people use to express themselves. An embodiment of the inventive system uses this fact to increase the number of relevant documents found. It does this through the mechanism of query expansion, i.e. modifying an initial query by adding more terms to it.

In typical query expansion scenarios, potential terms are gleaned from the set of N retrieved documents. When the query is executed, a standalone system will look for the most frequently occurring words and phrases in the top N retrieved documents (pseudo-relevance feedback) or the top N relevant documents (relevance feedback).

Query expansion is generally known to produce better search results. However, as with Example 3 above, the expansion terms found are still a function of the original query and a shallow, breadth first exploration centered around that query.

Instead, an embodiment of the inventive collaborative system automatically cross-fertilizes the searches from multiple users, using the top N docs or top N relevant documents not from the search of a user, but from the search of the user's search partner(s). In this manner, user can find query expansion terms that user otherwise might not have come up with on his own. Whether user feeds these additional search terms automatically back into user's own searches, or instead does manual selection, there is good potential for the user to come up with query formulations that let user explore areas of the collection that the user otherwise would not have reached.

Over the course of a collaborative search session there is the possibility that the global set of query expansion terms will converge. At a certain point, cross-fertilization could bring all searchers onto the same "page", so to speak. This is useful as well, as it is good indication that the most fruitful areas of a collection have been sufficiently explored.

Again, we note that this sort of collaborative cross-fertilization is entirely possible in the analog realm. Search team members can certainly talk to each other directly and share their ideas about useful query expansion terms. Nevertheless, this again places too much burden on the users. A built-in, systemic mediation of the present invention should be much more helpful.

As stated above, various embodiment of the inventive collaborative search system are designed to help users to automatically exchange various information that would facilitate collaborative search activities. The present invention is not limited to any specific types of information that is being exchanged. Specifically, in various exemplary embodiments, users can exchange suggestions, search terms or keywords obtained from documents found by other users, search query suggestions, documents found by individual users. In other embodiments, users can exchange information on relevance of at least one document determined by individual users, an indication that a query issued by one searcher has already been used by another. Users may also provide to each other relevant portions of documents that they have selected. The selected document portions exchanged by the users may include various information, such as image, video, audio, textual or language data, various metadata or tag information, as well as three dimensional model data, or any combinations thereof. It should be noted that the inventive system is not limited to any specific type of information being exchanged. Specifically, various other types of information may be exchanged during the collaborative search, such as, for example, smell information.

Various Exemplary Embodiments of Inventive System

The examples from above hint at one particular inventive system architecture: two users, three screens, working in the same room at the same time. However, the inventive concept is not limited to this particular embodiment. There are multiple possible configurations for collaborative exploratory search. The inventive concept resides in the idea of system-supported, system-augmented coordination of multiple searchers, rather than in one particular architecture.

For example, the inventive system is not limited to two collaborative searchers. While it may be preferable that number of the searchers be small, it is entirely possible for three, four, or more searchers to collaborate. The number of searchers might influence the type of facilitation done by the system (i.e. in example 3 above, the collaboration was done by picking two path endpoints; the algorithm will have to change slightly when there are three or four "endpoints", instead) but the core notion of system facilitation is not limited to a particular number.

Moreover, the inventive system can be used either live in-person (co-located) or via distributed co-presence (e.g. Web, Second Life, teleconference). Additionally, the inventive system may allow for either synchronous (real time) or asynchronous collaborative search.

In an embodiment of the inventive system the roles between players (i.e. individual searchers) may be equal, wherein each searcher is responsible for a complete, full subsystem: searching, picking query terms, assessing relevance, etc. In another embodiment, the player roles may be hierarchical—one human coordinator, mirroring the system coordinator, with multiple functionally separate subsystems. Each subsystem has a human specialist optimized for that functional area. For example, one human could be responsible for picking new query terms, another for assessing document relevance, and another for arranging relevant documents into topical partitions. The system-assisted human coordinator could ensure that the right information is flowing to the right people, or that there is not too much topic drift in the search as a whole. Finally, the user roles may be partitioned, wherein the searchers are separated by function, as above, but with no controlling hierarchy.

The inventive system may incorporate various collaborative input and display systems, such as multi-touch, multi-screen or multivalent. The system is not required to have separate displays for individual and joint results, as described earlier. Each user could have a joint/individual split screen on his personal monitor. Or the system could embed joint information within the individual results.

Usage Scenarios

There are a number of areas in which collaborative exploratory search of this nature is useful. The inventive system is not limited to any specific usages. Rather, the following examples are offered:

Literature reviews;

Legal and/or SOX-related issues (e.g.: Find all Enron documents pertaining to the setting up of phony subsidiaries.);

Searching the web for information on which digital camera to buy;

Searching the web for information about what your competitors are doing;

Trying to understand a world event from multiple viewpoints, i.e. through multiple, varied news sources;

Patent search in Fortune 500 companies. Need to know if some product they are planning on developing or releasing already has prior patents; and Real Estate search. Those wanting to purchase real estate may have slightly different ideas about important factors. At the same time, it is almost never the case that any one property meets all the requirements or desired factors (location, price, upgrades, layout, etc.). Therefore, letting all the people who would be involved in purchasing a piece of real estate coordinate their searches though a collaborative system would be invaluable.

Exemplary Computer Platform

Figure 3:
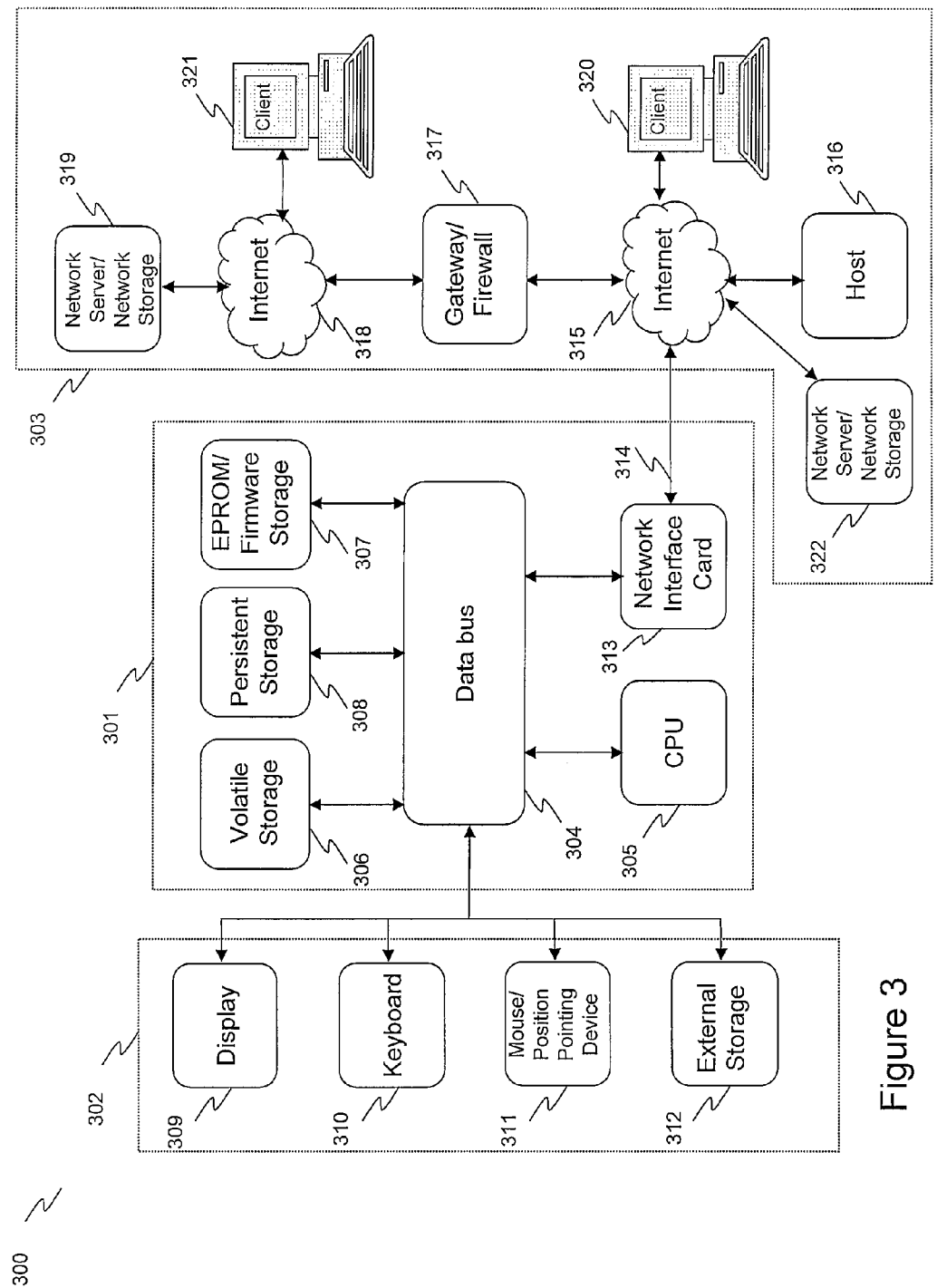
FIG. 3 illustrates an exemplary embodiment of a computer platform upon which the inventive system may be implemented.

FIG. 3 is a block diagram that illustrates an embodiment of a computer/server system 300 upon which an embodiment of the inventive methodology may be implemented. The system 300 includes a computer/server platform 301, peripheral devices 302 and network resources 303.

The computer platform 301 may include a data bus 304 or other communication mechanism for communicating information across and among various parts of the computer platform 301, and a processor 305 coupled with bus 301 for processing information and performing other computational and control tasks. Computer platform 301 also includes a volatile storage 306, such as a random access memory (RAM) or other dynamic storage device, coupled to bus 304 for storing various information as well as instructions to be executed by processor 305. The volatile storage 306 also may be used for storing temporary variables or other intermediate information during execution of instructions by processor 305. Computer platform 301 may further include a read only memory (ROM or EPROM) 307 or other static storage device coupled to bus 304 for storing static information and instructions for processor 305, such as basic input-output system (BIOS), as well as various system configuration parameters. A persistent storage device 308, such as a magnetic disk, optical disk, or solid-state flash memory device is provided and coupled to bus 301 for storing information and instructions.

Computer platform 301 may be coupled via bus 304 to a display 309, such as a cathode ray tube (CRT), plasma display, or a liquid crystal display (LCD), for displaying information to a system administrator or user of the computer platform 301. An input device 310, including alphanumeric and other keys, is coupled to bus 301 for communicating information and command selections to processor 305. Another type of user input device is cursor control device 311, such as a mouse, a trackball, or cursor direction keys for communicating direction information and command selections to processor 304 and for controlling cursor movement on display 309. This input device typically has two degrees of freedom in two axes, a first axis (e.g., x) and a second axis (e.g., y), that allows the device to specify positions in a plane.

An external storage device 312 may be connected to the computer platform 301 via bus 304 to provide an extra or removable storage capacity for the computer platform 301. In an embodiment of the computer system 300, the external removable storage device 312 may be used to facilitate exchange of data with other computer systems.

The invention is related to the use of computer system 300 for implementing the techniques described herein. In an embodiment, the inventive system may reside on a machine such as computer platform 301. According to one embodiment of the invention, the techniques described herein are performed by computer system 300 in response to processor 305 executing one or more sequences of one or more instructions contained in the volatile memory 306. Such instructions may be read into volatile memory 306 from another computer-readable medium, such as persistent storage device 308. Execution of the sequences of instructions contained in the volatile memory 306 causes processor 305 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 305 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 308. Volatile media includes dynamic memory, such as volatile storage 306. Transmission media includes coaxial cables, copper wire and fiber optics, including the wires that comprise data bus 304. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 305 for execution. For example, the instructions may initially be carried on a magnetic disk from a remote computer. Alternatively, a remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on the data bus 304. The bus 304 carries the data to the volatile storage 306, from which processor 305 retrieves and executes the instructions. The instructions received by the volatile memory 306 may optionally be stored on persistent storage device 308 either before or after execution by processor 305. The instructions may also be downloaded into the computer platform 301 via Internet using a variety of network data communication protocols well known in the art.

The computer platform 301 also includes a communication interface, such as network interface card 313 coupled to the data bus 304. Communication interface 313 provides a two-way data communication coupling to a network link 314 that is connected to a local network 315. For example, communication interface 313 may be an integrated services digital network (ISDN) card or a modem to provide a data communication connection to a corresponding type of telephone line. As another example, communication interface 313 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 313 sends and receives electrical, electromagnetic or optical signals that carry digital data streams representing various types of information.

Network link 313 typically provides data communication through one or more networks to other network resources. For example, network link 314 may provide a connection through local network 315 to a host computer 316, or a network storage/server 317. Additionally or alternatively, the network link 313 may connect through gateway/firewall 317 to the wide-area or global network 318, such as an Internet. Thus, the computer platform 301 can access network resources located anywhere on the Internet 318, such as a remote network storage/server 319. On the other hand, the computer platform 301 may also be accessed by clients located anywhere on the local area network 315 and/or the Internet 318. The network clients 320 and 321 may themselves be implemented based on the computer platform similar to the platform 301.

Local network 315 and the Internet 318 both use electrical, electromagnetic or optical signals that carry digital data streams. The signals through the various networks and the signals on network link 314 and through communication interface 313, which carry the digital data to and from computer platform 301, are exemplary forms of carrier waves transporting the information.

Computer platform 301 can send messages and receive data, including program code, through the variety of network(s) including Internet 318 and LAN 315, network link 314 and communication interface 313. In the Internet example, when the system 301 acts as a network server, it might transmit a requested code or data for an application program running on client(s) 320 and/or 321 through Internet 318, gateway/firewall 317, local area network 315 and communication interface 313. Similarly, it may receive code from other network resources.

The received code may be executed by processor 305 as it is received, and/or stored in persistent or volatile storage devices 308 and 306, respectively, or other non-volatile storage for later execution. In this manner, computer system 301 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized collaborative search system. It is intended that the specification and examples be considered as exemplary only, with a true scope and spirit of the invention being indicated by the following claims.

What is claimed is:

1. A collaborative search system configured to actively coordinate search activities of a plurality of individuals with a shared information need, wherein the active coordinating comprises:
   a memory comprising program instructions; and
   one or more processors coupled to said memory, wherein the program instructions are executable by at least one of said one or more processors to implement a joint search result component configured to:
   receiving at least two relevant documents from at least two of the plurality of individuals;
   causing search activities of a first one of the plurality of individuals to actively affect a second set of information provided to a second one of the plurality of individuals, and causing search activities of the second one of the plurality of individuals to actively affect a first set of information provided to the first one of the plurality of individuals;
   setting two of the at least two received documents as a first endpoint and a second endpoint and traversing a shortest path of a document space of search results derived from the search activities resulting in the two of the at least two received documents between the first endpoint and the second endpoint to find candidate relevant documents; and
   displaying the found candidate relevant documents on a joint display subsystem;
   wherein when one of the found candidate relevant documents occurs within other paths of user-selected relevant endpoints, flagging the one of the found candidate relevant documents as being relevant;
   wherein the active coordination of search activities of a plurality of individuals occurs synchronously with the search activities of the plurality of users.

2. The collaborative search system of claim 1, wherein the second set of information comprises at least one suggestion to the second one of the plurality of individuals, the at least one suggestion being generated based on the search activities of the first one of the plurality of individuals.

3. The collaborative search system of claim 2, wherein the generated suggestion provided to the second one of the plurality of individuals comprises at least one search term obtained from at least one document found by the first one of the plurality of individuals.

4. The collaborative search system of claim 2, wherein the generated suggestion comprises a search query suggestion.

5. The collaborative search system of claim 1, wherein the first set of information comprises at least a first document found by the second one of the plurality of individuals and wherein the second set of information comprises at least a second document found by the first one of the plurality of individuals.

6. The collaborative search system of claim 1, wherein the first set of information comprises at least a first keyword used by the second one of the plurality of individuals and wherein the second set of information comprises at least a second keyword used by the first one of the plurality of individuals.

7. The collaborative search system of claim 1, wherein the first set of information comprises a relevance of at least one document determined by the second one of the plurality of individuals.

8. The collaborative search system of claim 1, wherein the first set of information comprises a relevance of at least a portion of a document determined by the second one of the plurality of individuals.

9. The collaborative search system of claim 1, wherein the first set of information comprises an indication that a query issued by the first of the plurality of individuals has already been used by the second of the plurality of individuals.

10. The collaborative search system of claim 1, wherein the first set of information comprises a portion of at least one document selected by the second one of the plurality of individuals.

11. The collaborative search system of claim 10, wherein the selected portion of the at least one document comprises at least one of image, video or audio.

12. The collaborative search system of claim 10, wherein the selected portion of the at least one document comprises a textual or language data.

13. The collaborative search system of claim 10, wherein the selected portion of the at least one document comprises metadata or tag data.

14. The collaborative search system of claim 10, wherein the selected portion of the at least one document comprises a three dimensional model data.

15. The collaborative search system of claim 1, further operable to cause information relating to search activities of the plurality of individuals to be displayed on a joint information display.

16. The collaborative search system of claim 1, further operable to cause information relating to individual search activities of one of the plurality of individuals to be displayed on an individual information display.

17. The collaborative search system of claim 1, further operable to receive individual search information from an individual search subsystem.

18. A collaborative search method comprising
receiving at least two relevant documents from at least two of the plurality of individuals;
actively coordinating search activities of a plurality of individuals with a shared information need, wherein the active coordinating comprises causing search activities of a first one of the plurality of individuals to actively affect a second set of information provided to a second one of the plurality of individuals, and
causing search activities of the second one of the plurality of individuals to actively affect a first set of information provided to the first one of the plurality of individuals;
setting two of the at least two received documents as a first endpoint and a second endpoint and traversing a shortest path of a document space of search results derived from the search activities resulting in the two of the at least two received documents between the first endpoint and the second endpoint to find candidate relevant documents between the first endpoint and the second endpoint; and
displaying the found candidate relevant documents on a joint display subsystem;
wherein when one of the found candidate relevant documents occurs within other paths of user-selected relevant endpoints, flagging the one of the found candidate relevant documents as being relevant;
wherein the active coordination of search activities of a plurality of individuals occurs synchronously with the search activities of the plurality of users.

19. The collaborative search method of claim 18, wherein the second set of information comprises at least one suggestion to the second one of the plurality of individuals, the at least one suggestion being generated based on the search activities of the first one of the plurality of individuals.

20. The collaborative search method of claim 19, wherein the generated suggestion provided to the second one of the plurality of individuals comprises at least one search term obtained from at least one document found by the first one of the plurality of individuals.

21. The collaborative search method of claim 19, wherein the generated suggestion comprises a search query suggestion.

22. The collaborative search method of claim 18, wherein the first set of information comprises at least a first document found by the second one of the plurality of individuals and wherein the second set of information comprises at least a second document found by the first one of the plurality of individuals.

23. The collaborative search method of claim 18, wherein the first set of information comprises at least a first keyword used by the second one of the plurality of individuals and wherein the second set of information comprises at least a second keyword used by the first one of the plurality of individuals.

24. The collaborative search method of claim 18, wherein the first set of information comprises a relevance of at least one document determined by the second one of the plurality of individuals.

25. The collaborative search method of claim 18, wherein the first set of information comprises a relevance of at least a portion of a document determined by the second one of the plurality of individuals.

26. The collaborative search method of claim 18, wherein the first set of information comprises an indication that a query issued by the first of the plurality of individuals has already been used by the second of the plurality of individuals.

27. The collaborative search method of claim 18, wherein the first set of information comprises a portion of at least one document selected by the second one of the plurality of individuals.

28. The collaborative search method of claim 27, wherein the selected portion of the at least one document comprises at least one of image, video or audio.

29. The collaborative search method of claim 27, wherein the selected portion of the at least one document comprises a textual or language data.

30. The collaborative search method of claim 27, wherein the selected portion of the at least one document comprises metadata or tag data.

31. The collaborative search method of claim 27, wherein the selected portion of the at least one document comprises a three dimensional model data.

32. The collaborative search method of claim 18, further comprising causing information relating to search activities of the plurality of individuals to be displayed on a joint information display.

33. The collaborative search method of claim 18, further comprising causing information relating to individual search activities of one of the plurality of individuals to be displayed on an individual information display.

34. The collaborative search method of claim 18, further comprising receiving individual search information from an individual search subsystem.

35. A non-transitory computer readable medium embodying computer-readable instructions implementing a collaborative search method comprising
　receiving at least two relevant documents from at least two of the plurality of individuals;
　actively coordinating search activities of a plurality of individuals with a shared information need, wherein the active coordinating comprises causing search activities of a first one of the plurality of individuals to actively affect a second set of information provided to a second one of the plurality of individuals, and causing search activities of the second one of the plurality of individuals to actively affect a first set of information provided to the first one of the plurality of individuals;
　setting two of the at least two received documents as a first endpoint and a second endpoint and traversing a shortest path of a document space of search results derived from the search activities resulting in the two of the at least two received documents between the first endpoint and the second endpoint to find candidate relevant documents between the first endpoint and the second endpoint; and
　displaying the candidate relevant found documents on a joint display subsystem;
　wherein when one of the found candidate relevant documents occurs within other paths of user-selected relevant endpoints, flagging the one of the found candidate relevant documents as being relevant;
　wherein the active coordination of search activities of a plurality of individuals occurs synchronously with the search activities of the plurality of users.

36. The joint search subsystem of claim 1, wherein the causing search activities of a first one of the plurality of individuals to actively affect a second set of information provided to a second one of the plurality of individuals comprises actively affecting the second set of information based on receiving a flag indicating a relevant document from the first one of the plurality of individuals.

37. The joint search subsystem of claim 1, wherein the active coordination of search activities of a plurality of individuals is conducted based on roles assigned to each of the plurality of individuals.

38. The joint search subsystem of claim 1, wherein the causing search activities of a second one of the plurality of individuals to actively affect a first set of information provided to a second one of the plurality of individuals comprises actively affecting the first set of information based on receiving a flag indicating a relevant document from the second one of the plurality of individuals.

* * * * *